(12) United States Patent
Chang et al.

(10) Patent No.: US 9,312,956 B2
(45) Date of Patent: Apr. 12, 2016

(54) FIBER-OPTIC COMMUNICATION APPARATUS CAPABLE OF OPERATING IN A NORMAL MODE AND A POWER CALIBRATION MODE, AND COMMUNICATION DEVICE USED WITHIN THE SAME

(71) Applicants: Amoesolu Corporation, Taipei (TW); Transystem Inc, Hsinchu (TW)

(72) Inventors: Lee-Chuan Chang, Hsinchu County (TW); Wen-Jye Huang, Taipei (TW); Chuang-Chun Chiou, Taipei (TW); Cheng-Yen Chen, Taipei (TW)

(73) Assignees: Amoesolu Corporation, Taipei (TW); Transystem Inc., Hsinchu (TW)

( * ) Notice: Subject to any disclaimer, the term of this patent is extended or adjusted under 35 U.S.C. 154(b) by 91 days.

(21) Appl. No.: 14/166,430

(22) Filed: Jan. 28, 2014

(65) Prior Publication Data

US 2014/0363158 A1 Dec. 11, 2014

(30) Foreign Application Priority Data

Jun. 5, 2013 (TW) .............................. 102119939 A

(51) Int. Cl.
| | |
|---|---|
| *H04B 17/00* | (2015.01) |
| *H04B 10/07* | (2013.01) |
| *H04B 10/2575* | (2013.01) |
| *H04B 10/073* | (2013.01) |
| *H04B 10/564* | (2013.01) |

(52) U.S. Cl.
CPC .......... *H04B 10/2575* (2013.01); *H04B 10/073* (2013.01); *H04B 10/564* (2013.01)

(58) Field of Classification Search
CPC .................................. H04B 10/2575–10/2587
See application file for complete search history.

(56) References Cited

U.S. PATENT DOCUMENTS

| | | | | |
|---|---|---|---|---|
| 5,339,184 | A * | 8/1994 | Tang ............................. | 398/116 |
| 5,644,622 | A * | 7/1997 | Russell et al. ............. | 455/422.1 |
| 6,801,767 | B1 * | 10/2004 | Schwartz et al. .......... | 455/426.2 |
| 6,978,091 | B1 * | 12/2005 | Needle ............................ | 398/72 |
| 7,043,271 | B1 * | 5/2006 | Seto et al. .................. | 455/562.1 |
| 7,113,667 | B2 * | 9/2006 | Welch et al. .................... | 385/24 |
| 7,542,685 | B2 * | 6/2009 | Bai et al. ....................... | 398/193 |
| 7,840,145 | B2 * | 11/2010 | Harres .......................... | 398/209 |
| 7,865,083 | B1 * | 1/2011 | Stevens .......................... | 398/91 |
| 8,086,110 | B2 * | 12/2011 | Watts et al. .................... | 398/194 |
| 8,971,722 | B2 * | 3/2015 | Chan et al. .................... | 398/171 |
| 2001/0036835 | A1 * | 11/2001 | Leedom, Jr. .................. | 455/509 |
| 2002/0003645 | A1 * | 1/2002 | Kim et al. ..................... | 359/145 |
| 2002/0114038 | A1 * | 8/2002 | Arnon et al. .................. | 359/145 |
| 2002/0159118 | A1 * | 10/2002 | Hiramatsu et al. ............. | 359/139 |
| 2005/0220003 | A1 * | 10/2005 | Palaskas et al. ............... | 370/210 |
| 2006/0229026 | A1 * | 10/2006 | Lynch ............................. | 455/69 |

(Continued)

*Primary Examiner* — Li Liu
(74) *Attorney, Agent, or Firm* — Blank Rome LLP

(57) ABSTRACT

A fiber-optic communication apparatus includes first and second communication devices interconnected by an optical fiber cable. The first communication device converts one of a calibration signal with a predetermined power level and a radio frequency (RF) signal into an optical signal. The second communication device converts the optical signal, which is transmitted through the optical fiber cable, into an electrical signal, detects a power level of the electrical signal associated with the calibration signal, obtains a power attenuation ratio based on the power level detected thereby and the predetermined power level, and adjusts the power level of the electrical signal associated with the RF signal based on the power attenuation ratio.

7 Claims, 3 Drawing Sheets

(56) References Cited

U.S. PATENT DOCUMENTS

| | | | |
|---|---|---|---|
| 2008/0063397 A1* | 3/2008 | Hu et al. | 398/43 |
| 2008/0166135 A1* | 7/2008 | Ann | 398/197 |
| 2009/0167578 A1* | 7/2009 | Takahashi et al. | 341/120 |
| 2010/0087227 A1* | 4/2010 | Francos et al. | 455/562.1 |
| 2010/0226304 A1* | 9/2010 | Shoji | 370/315 |
| 2011/0068971 A1* | 3/2011 | Kusyk | 342/174 |
| 2011/0122977 A1* | 5/2011 | Ludwig | 375/346 |
| 2012/0134666 A1* | 5/2012 | Casterline et al. | 398/22 |
| 2013/0064545 A1* | 3/2013 | Sun | 398/70 |
| 2014/0212133 A1* | 7/2014 | Kobayashi et al. | 398/25 |

* cited by examiner and a communication device that are capable of operating in
FIBER-OPTIC COMMUNICATION APPARATUS CAPABLE OF OPERATING IN A NORMAL MODE AND A POWER CALIBRATION MODE, AND COMMUNICATION DEVICE USED WITHIN THE SAME

CROSS-REFERENCE TO RELATED APPLICATION

This application claims priority of Taiwanese Application No. 102119939, filed on Jun. 5, 2013, the contents of which are hereby incorporated by reference.

BACKGROUND OF THE INVENTION

1. Field of the Invention

This invention relates to fiber-optic communication, and more particularly to a fiber-optic communication apparatus a normal mode and a power calibration mode.

2. Description of the Related Art

A conventional fiber-optic communication apparatus includes a first communication device, a second communication device, and an optical fiber cable interconnecting the first and second communication devices. The first communication device converts a radio frequency (RF) signal into an optical signal. The second communication device receives the optical signal, which is transmitted from the first communication device through the optical fiber cable, converts the optical signal into an electrical signal, and transmits the electrical signal.

Since the optical signal is attenuated when it passes through the optical fiber cable, a power level of the electrical signal is less than a power level of the RF signal, and a ratio of the power level of the electrical signal to the power level of the RF signal is dependent on a length of the optical fiber cable and environment conditions. Therefore, the power level of the electrical signal may be too low so that the electrical signal may not be transmitted by the second communication device. Even if the electrical signal can be transmitted by the second communication device and then received by a receiving device, the receiving device may not completely and accurately obtain data carried by the electrical signal.

SUMMARY OF THE INVENTION

Therefore, an object of the present invention is to provide a fiber-optic communication apparatus and a communication device that can overcome the aforesaid drawbacks associated with the prior art.

According to one aspect of this invention, a fiber-optic communication apparatus is capable of operating in a normal mode and a power calibration mode, and comprises a first communication device, a second communication device, and an optical fiber cable interconnecting the first and second communication devices. The first communication device includes a signal generator, a multiplexer, a controller and an electro-optic converter. The signal generator is operable to generate a calibration signal with a predetermined power level. The multiplexer is coupled to the signal generator for receiving the calibration signal therefrom, and further receives a radio frequency (RF) signal. The multiplexer is operable to output one of the calibration signal and the RF signal as a selection signal in response to a control signal. The controller is coupled to the multiplexer, and is operable to generate the control signal in accordance with a desired one of the normal mode and the power calibration mode of the fiber-optic communication apparatus, such that the multiplexer outputs the calibration signal as the selection signal when the fiber-optic communication apparatus operates in the power calibration mode, and outputs the RF signal as the selection signal when the fiber-optic communication apparatus operates in the normal mode. The electro-optic converter is coupled between the multiplexer and one end of the optical fiber cable for converting the selection signal from the multiplexer into an optical signal. The second communication device includes an optic-electro converter and a calibration unit. The optic-electro converter is coupled to the other end of the optical fiber cable for receiving the optical signal, which is transmitted from the first communication device through the optical fiber cable, and is operable to convert the optical signal into an electrical signal. The calibration unit is coupled to the optic-electro converter for receiving the electrical signal therefrom. When the fiber-optic communication apparatus operates in the power calibration mode, the calibration unit is operable to detect a power level of the electrical signal associated with the calibration signal and to obtain a power attenuation ratio based on the power level detected thereby and the predetermined power level. When the fiber-optic communication apparatus operates in the normal mode, the calibration unit is operable to adjust the power level of the electrical signal associated with the RF signal based on the power attenuation ratio so as to generate an output signal with the adjusted power level.

According to another aspect of this invention, a communication device comprises a signal generator, a multiplexer, a controller and an electro-optic converter. The signal generator is operable to generate a calibration signal. The multiplexer is coupled to the signal generator for receiving the calibration signal therefrom, and further receives a radio frequency (RF) signal. The controller is coupled to the multiplexer, and is operable to generate and output a control signal to the multiplexer to control the multiplexer to output one of the calibration signal and the RF signal as a selection signal. The electro-optic converter is coupled to the multiplexer for converting the selection signal therefrom into an optical signal.

According to yet another aspect of this invention, a communication device is configured to be used within a fiber-optic communication apparatus capable of operating in a normal mode and a power calibration mode, and comprises a signal generator, an antenna, a multiplexer, a controller, a calibration unit and an electro-optic converter. The signal generator is operable to generate a calibration signal with a predetermined power level. The antenna is operable to receive a radio frequency (RF) signal therethrough. The multiplexer is coupled between the signal generator and the antenna for receiving the calibration signal and the RF signal therefrom, respectively. The multiplexer is operable to output one of the calibration signal and the RF signal as a selection signal in response to a control signal. The controller is coupled to the multiplexer, and is operable to generate the control signal in accordance with a desired one of the normal and power calibration modes of the communication device such that the multiplexer outputs the calibration signal as the selection signal when the fiber-optic communication apparatus operates in the power calibration mode, and outputs the RF signal as the selection signal when the fiber-optic communication apparatus operates in the normal mode. The calibration unit is coupled to the multiplexer for receiving the selection signal therefrom, and further receives a detection signal indicating a detected power level. When the fiber-optic communication apparatus operates in the power calibration mode, the calibration unit is operable to generate an output signal, which has a power level identical to that of the calibration signal serving as the selection signal, and to obtain a power attenuation ratio based on the detected power level indicated by the detection signal and the predetermined power level. When the fiber-optic communication apparatus operates in the normal mode, the calibration unit is operable to adjust a power level of the RF signal serving as the selection signal based on the power attenuation ratio such that the RF signal with the adjusted power level serves as the output signal. The electro-optic converter is coupled to the calibration unit for converting the output signal therefrom into an optical signal.

BRIEF DESCRIPTION OF THE DRAWINGS

Other features and advantages of the present invention will become apparent in the following detailed description of the preferred embodiments of this invention, with reference to the accompanying drawings, in which.

DETAILED DESCRIPTION OF THE PREFERRED EMBODIMENTS

Figure 1:
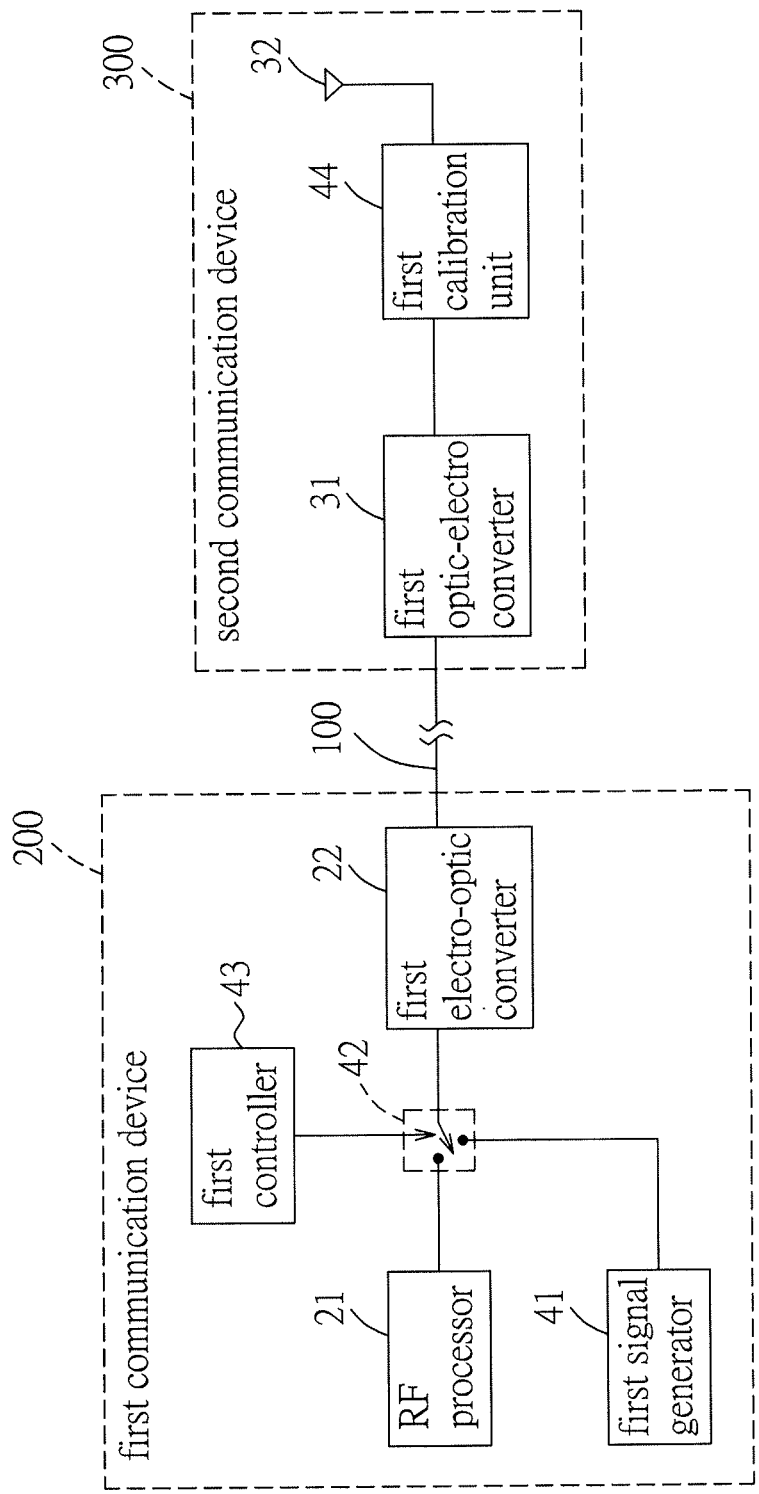
FIG. 1 is a schematic block diagram illustrating the first preferred embodiment of a fiber-optic communication apparatus according to this invention.

Referring to FIG. 1, the first preferred embodiment of a fiber-optic communication apparatus according to this invention is shown to include a first communication device 200, a second communication device 300, and an optical fiber cable 100 interconnecting the first and second communication devices 200, 300. The fiber-optic communication apparatus is capable of operating in a normal mode and a power calibration mode.

The first communication device 200 includes a first signal generator 41, a radio frequency (RF) processor 21, a first multiplexer 42, a first controller 43 and a first electro-optic converter 22. The first signal generator 41 is operable to generate a first calibration signal with a first predetermined power level. The RF processor 21 is operable to generate a first RF signal. The first multiplexer 42 is coupled to the first signal generator 41 and the RF processor 21, receives the first calibration signal from the first signal generator 41, and further receives the first RF signal from the RF processor 21. The first multiplexer 42 is operable to output one of the first calibration signal and the first RF signal as a first selection signal in response to a first control signal. The first controller 43 is coupled to the first multiplexer 42, and is operable to generate the first control signal in accordance with a desired one of the normal mode and the power calibration mode of the fiber-optic communication apparatus, such that the first multiplexer 42 outputs the first calibration signal as the first selection signal when the fiber-optic communication apparatus operates in the power calibration mode, and outputs the first RF signal as the first selection signal when the fiber-optic communication apparatus operates in the normal mode. The first electro-optic converter 22 is coupled between the first multiplexer 42 and one end of the optical fiber cable 100, and is operable to convert the first selection signal from the first multiplexer 42 into a first optical signal.

The second communication device 300 includes a first optic-electro converter 31, a first calibration unit 44 and a first antenna 32. The first optic-electro converter 31 is coupled to the other end of the optical fiber cable 100, and receives the first optical signal, which is transmitted from the first communication device 200 through the optical fiber cable 100, so as to convert the first optical signal into a first electrical signal. The first calibration unit 44 is coupled to the first optic-electro converter 44 for receiving the first electrical signal therefrom, and pre-stores the first predetermined power level of the first calibration signal therein.

When the fiber-optic communication apparatus operates in the power calibration mode, the first calibration unit 44 is operable to detect a power level of the first electrical signal associated with the first calibration signal and to obtain a first power attenuation ratio based on the power level detected thereby and the first predetermined power level. For example, the first power attenuation ratio is equal to a ratio of the power level detected by the first calibration unit 44 to the first predetermined power level. When the fiber-optic communication apparatus operates in the normal mode, the first calibration unit 44 is operable to adjust the power level of the first electrical signal associated with the first RF signal based on the first power attenuation ratio so as to generate a first output signal with an adjusted power level. For example, the adjusted power level is equal to a power level of the first RF signal, or a product of the power level of the first RF signal by a constant other than 1. The first antenna 32 is coupled to the first calibration unit 44, and transmits the first output signal from the first calibration unit 44 therethrough. In operation, the fiber-optic communication apparatus normally operates in the normal mode, switches to the power calibration mode when it is necessary to update the first power attenuation ratio, and switches back to the normal mode after the first calibration unit 44 obtains the first power attenuation ratio.

Therefore, by obtaining the first power attenuation ratio that is dependent on a length of the optical fiber cable 100 and environment conditions, and by adjusting the power level of the first electrical signal based on the first power attenuation ratio, the adjusted power level is sufficient so that the first output signal may be transmitted by the first antenna 32, and a possibility that a receiving device (not shown) may completely and accurately receive the first output signal and obtain data carried thereby increases.

Figure 2:
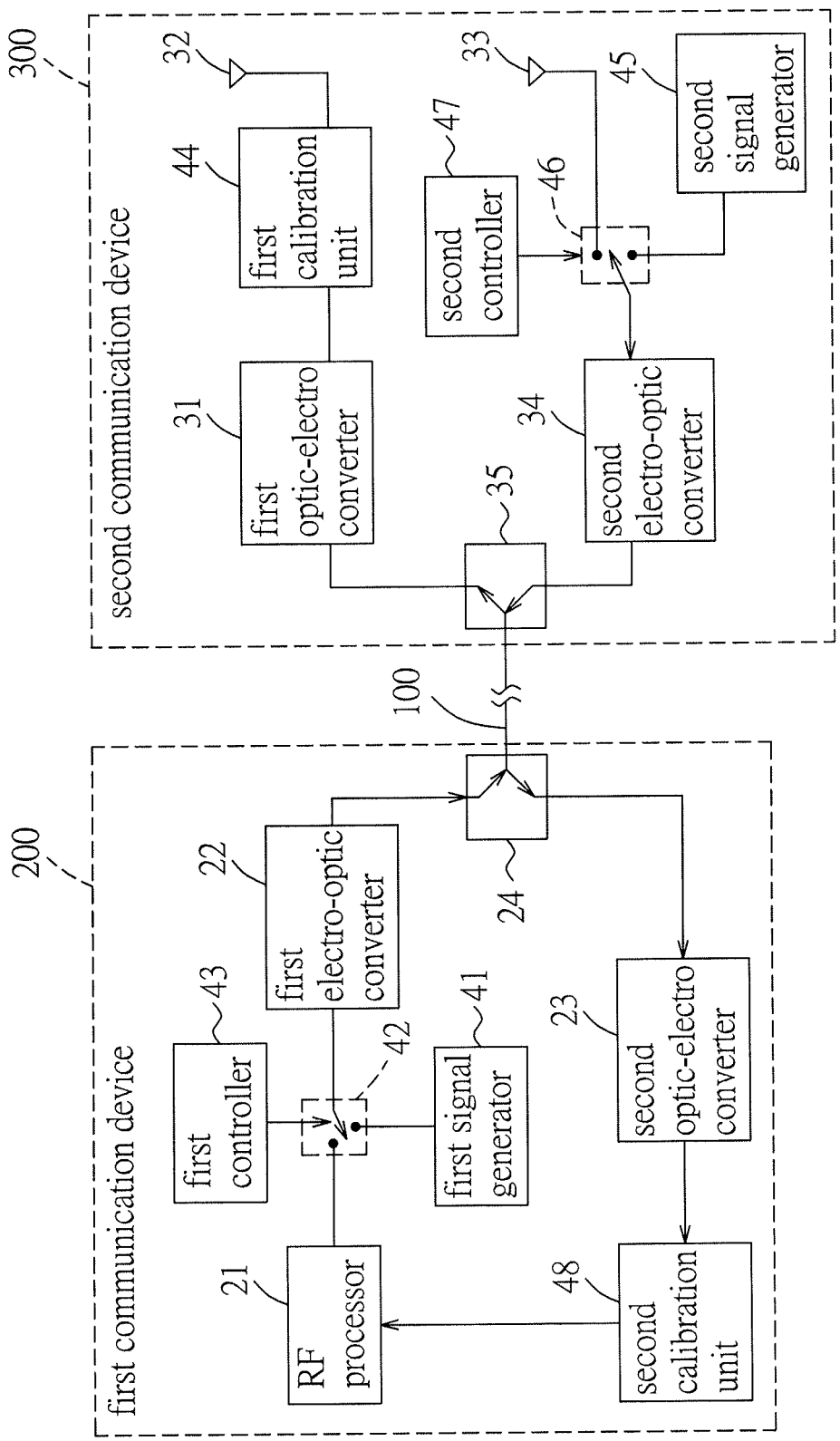
FIG. 2 is a schematic block diagram illustrating the second preferred embodiment of a fiber-optic communication apparatus according to this invention.

FIG. 2 illustrates the second preferred embodiment of a fiber-optic communication apparatus according to this invention, which is a modification of the first preferred embodiment. Unlike the first preferred embodiment, the second communication device 300 in the second preferred embodiment further includes a second signal generator 45, a second antenna 33, a second multiplexer 46, a second controller 47, a second electro-optic converter 34 and a first optical director 35. The second signal generator 45 is operable to generate a second calibration signal with a second predetermined power level. The second antenna 33 receives a second RF signal therethrough. The second multiplexer 46 is coupled to the second signal generator 45 and the second antenna 33, receives the second calibration signal from the second signal generator 45, and further receives the second RF signal from the second antenna 33. The second multiplexer 46 is operable to output one of the second calibration signal and the second RF signal as a second selection signal in response to a second control signal. The second controller 47 is coupled to the second multiplexer 46, and is operable to generate the second control signal in accordance with the desired one of the normal and power calibration modes of the fiber-optic communication apparatus, such that the second multiplexer 46 outputs the second calibration signal as the second selection signal when the fiber-optic communication apparatus operates in the power calibration mode, and outputs the second RF signal as the second selection signal when the fiber-optic communication apparatus operates in the normal mode. The second electro-optic converter 34 is coupled to the second multiplexer 46 for converting the second selection signal therefrom into a second optical signal. The first optical director 35 is coupled among the other end of the optical fiber cable 35, the first optic-electro converter 31 and the second electro-optic converter 34 for transmitting the first optical signal, which is transmitted from the first communication device 200 through the optical fiber cable 100, to the first optic-electro converter 31 therethrough and for transmitting the second optical signal from the second electro-optic converter 34 to the optical fiber cable 100 therethrough.

In addition, the first communication device 200 further includes a second optic-electro converter 23, a second optical director 24 and a second calibration unit 48. The second optical director 24 is coupled among said one end of the optical fiber cable 100, the first electro-optic converter 22 and the second optic-electro converter 23 for transmitting the first optical signal from the first electro-optic converter 22 to the optical fiber cable 100 therethrough and for transmitting the second optical signal, which is transmitted from the second communication device 300 through the optical fiber cable 100, to the second optic-electro converter 23 therethrough. The second optic-electro converter 23 converts the second optical signal into a second electrical signal. The second calibration unit 48 is coupled between the second optic-electro converter 23 and the RF processor 21, receives the second electrical signal from the second optic-electro converter 23, and pre-stores the second predetermined power level of the second calibration signal therein.

When the fiber-optic communication apparatus operates in the power calibration mode, the second calibration unit 48 is operable to detect a power level of the second electrical signal associated with the second calibration signal and to obtain a second power attenuation ratio based on the power level detected thereby and the second predetermined power level. For example, the second power attenuation ratio is equal to a ratio of the power level detected by the second calibration unit 48 to the second predetermined power level. When the fiber-optic communication apparatus operates in the normal mode, the second calibration unit 48 is operable to adjust the power level of the second electrical signal associated with the second RF signal based on the second power attenuation ratio so as to generate a second output signal with an adjusted power level, and outputs the second output signal to the RF processor 21. For example, the adjusted power level is equal to a power level of the second RF signal, or a product of the power level of the second RF signal by a constant other than 1. Similarly, the fiber-optic communication apparatus normally operates in the normal mode, switches to the power calibration mode when it is necessary to update the first and second power attenuation ratios, and switches back to the normal mode after both the first and second calibration units 44, 48 obtain the first and second power attenuation ratios, respectively.

Therefore, by obtaining the second power attenuation ratio that is dependent on the length of the optical fiber cable 100 and the environment conditions, and by adjusting the power level of the second electrical signal based on the second power attenuation ratio, the adjusted power level is sufficient so that the RF processor 21 may completely and accurately obtain data carried by the second output signal.

Figure 3:
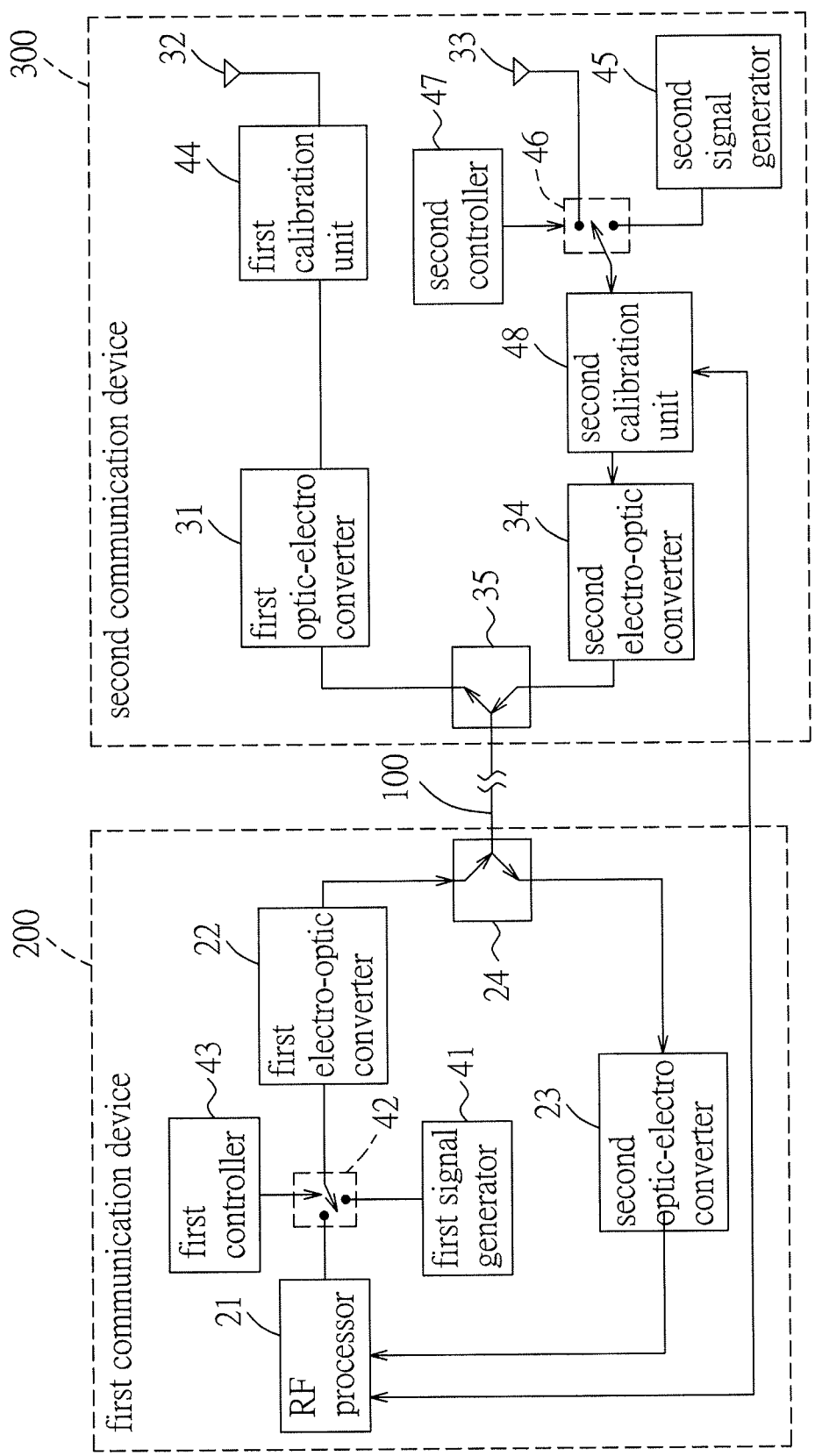
FIG. 3 is a schematic block diagram illustrating the third preferred embodiment of a fiber-optic communication apparatus according to this invention.

FIG. 3 illustrates the third preferred embodiment of a fiber-optic communication apparatus according to this invention, which is a modification of the second preferred embodiment. Unlike the second preferred embodiment, the second calibration unit 48 in the third preferred embodiment is included in the second communication device 300 instead of the first communication device 200. The second calibration unit 48 is coupled between the second multiplexer 46 and the second electro-optic converter 34, receives the second selection signal from the second multiplexer 46, and further receives a detection signal indicating a detected power level.

When the fiber-optic communication apparatus operates in the power calibration mode, the second calibration unit 48 is operable to generate the second output signal, which has a power level identical to that of the second calibration signal serving as the second selection signal, and to obtain the second power attenuation ratio based on the detected power level indicated by the detection signal and the second predetermined power level. For example, the second power attenuation ratio is equal to a ratio of the detected power level to the second predetermined power level. When the fiber-optic communication apparatus operates in the normal mode, the second calibration unit 48 is operable to adjust a power level of the second RF signal serving as the second selection signal by a multiplication factor based on the second power attenuation ratio such that the second RF signal with an adjusted power level serves as the second output signal. The second electro-optic converter 34 receives the second output signal from the second calibration unit 48, and converts the second output signal into the second optical signal.

In addition, in the first communication device 200, the RF processor 21 is coupled among the first multiplexer 42, the second optic-electro converter 23 and the second calibration unit 48 of the second communication device 300, and receives the second electrical signal from the second optic-electro converter 23. The RF processor 21 is operable to generate the first RF signal and to detect a power level of the second electrical signal so as to generate the detection signal, and outputs the first RF signal and the detection signal respectively to the first multiplexer 42 and the second calibration unit 48 of the second communication device 300.

Therefore, when the fiber-optic communication apparatus operates in the power calibration mode, the detection signal indicates the detected power level of the second electrical signal associated with the second calibration signal. When the fiber-optic communication apparatus operates in the normal mode, the adjusted power level is sufficient so that the power level of the second electrical signal is equal to, for example, the power level of the second RF signal, or a product of the power level of the second RF signal by a constant other than 1.

Moreover, in this embodiment, when the fiber-optic communication apparatus operates in the power calibration mode, the RF processor 21 of the first communication device 200 is further operable to estimate a distance between the first and second communication devices 200, 300 based on the detected power level indicated by the detection signal and the second predetermined power level. However, in other embodiments, when the fiber-optic communication apparatus operates in the normal mode, the second calibration unit 48 of the second communication device 300 is operable to further generate an indication signal indicating the multiplication factor based on the second power attenuation ratio, and the RF processor 21 of the first communication device 200 further receives the indication signal from the second calibration unit 48 of the second communication device 300, and is further operable to estimate the distance between the first and second communication devices 200, 300 based on the multiplication factor indicated by the indication signal.

While the present invention has been described in connection with what are considered the most practical and preferred embodiments, it is understood that this invention is not limited to the disclosed embodiments but is intended to cover various arrangements included within the spirit and scope of the broadest interpretation and equivalent arrangements.

What is claimed is:

1. A fiber-optic communication apparatus capable of operating in a normal mode and a power calibration mode, said fiber-optic communication apparatus comprising:
   a first communication device;
   a second communication device; and
   an optical fiber cable interconnecting said first and second communication devices;
   said first communication device including
      a first signal generator operable to generate a first calibration signal with a first predetermined power level,
      a first multiplexer coupled to said first signal generator for receiving the first calibration signal therefrom and for further receiving a first radio frequency (RF) signal, said first multiplexer being operable to output one of the first calibration signal and the first RF signal as a first selection signal in response to a first control signal,
      a first controller coupled to said first multiplexer, and operable to generate the first control signal in accordance with a desired one of the normal mode and the power calibration mode of said fiber-optic communication apparatus, such that said first multiplexer outputs the first calibration signal as the first selection signal when said fiber-optic communication apparatus operates in the power calibration mode, and outputs the first RF signal as the first selection signal when said fiber-optic communication apparatus operates in the normal mode, and
      a first electro-optic converter coupled between said first multiplexer and one end of said optical fiber cable for converting the first selection signal from said first multiplexer into a first optical signal;
   said second communication device including
      a first optic-electro converter coupled to the other end of said optical fiber cable for receiving the first optical signal, which is transmitted from said first communication device through said optical fiber cable, and operable to convert the first optical signal into a first electrical signal, and
      a first calibration unit coupled to said first optic-electro converter for receiving the first electrical signal therefrom, said first calibration unit being operable to
         detect a power level of the first electrical signal associated with the first calibration signal and obtain a first power attenuation ratio based on the power level detected thereby and the first predetermined power level when said fiber-optic communication apparatus operates in the power calibration mode, and
         adjust the power level of the first electrical signal associated with the first RF signal based on the first power attenuation ratio so as to generate a first output signal with the adjusted power level when said fiber-optic communication apparatus operates in the normal mode,
      a second signal generator operable to generate a second calibration signal with a second predetermined power level,
      a second multiplexer coupled to said second signal generator for receiving the second calibration signal therefrom, and further receiving a second RF signal, said second multiplexer being operable to output one of the second calibration signal and the second RF signal as a second selection signal in response to a second control signal,
      a second controller coupled to said second multiplexer, and operable to generate the second control signal in accordance with the desired one of the normal and power calibration modes of said fiber-optic communication apparatus, such that said second multiplexer outputs the second calibration signal as the second selection signal when said fiber-optic communication apparatus operates in the power calibration mode, and outputs the second RF signal as the second selection signal when said fiber-optic communication apparatus operates in the normal mode,
      a second calibration unit coupled to said second multiplexer for receiving the second selection signal therefrom, and configured to receive from said first communication device a detection signal indicating a detected power level, said second calibration unit being operable to
         generate a second output signal, which has a power level identical to that of the second calibration signal serving as the second selection signal, and to obtain a second power attenuation ratio based on the detected power level indicated by the detection signal and the second predetermined power level when said fiber-optic communication apparatus operates in the power calibration mode, and
         adjust a power level of the second RF signal serving as the second selection signal by a multiplication factor based on the second power attenuation ratio such that the second RF signal with the adjusted power level serves as the second output signal when said fiber-optic communication apparatus operates in the normal mode,
      a second electro-optic converter coupled to said second calibration unit for converting the second output signal therefrom into a second optical signal, and
      a first optical director coupled among the other end of said optical fiber cable, said first optic-electro converter and said second electro-optic converter for transmitting the first optical signal, which is transmitted from said first communication device through said optical fiber cable, to said first optic-electro converter therethrough and for transmitting the second optical signal from said second electro-optic converter to said optical fiber cable therethrough,
   wherein said first communication device further includes
      a second optic-electro converter, and
      a second optical director coupled among said one end of said optical fiber cable, said first electro-optic converter and said second optic-electro converter for transmitting the first optical signal from said first electro-optic converter to said optical fiber cable therethrough and for transmitting the second optical signal, which is transmitted from said second communication device through said optical fiber cable, to said second optic-electro converter therethrough, said second optic-electro converter being operable to convert the second optical signal into a second electrical signal.

2. The fiber-optic communication apparatus of claim 1, wherein, for signal transmission of said fiber-optic communication apparatus:
   said first communication device further includes an RF processor coupled to said first multiplexer, and operable to generate the first RF signal and output the first RF signal to said first multiplexer; and said second communication device further includes an antenna coupled to said first calibration unit and transmitting the first output signal from said first calibration unit therethrough.

3. The fiber-optic communication apparatus of claim 1, wherein, for signal reception of said fiber-optic communication apparatus:

said first device further includes an antenna coupled to said first multiplexer, receiving the first RF signal therethrough, and transmitting the first RF signal to said first multiplexer; and said second device further includes an RF processor coupled to said first calibration unit for receiving the first output signal therefrom.

4. The fiber-optic communication apparatus of claim 1, wherein:

said first communication device further includes an RF processor coupled among said first multiplexer, said second optic-electro converter and said second calibration unit of said second communication device, and receiving the second electrical signal from said second optic-electro converter, said RF processor being operable to generate the first RF signal and to detect a power level of the second electrical signal so as to generate the detection signal, and to output the first RF signal and the detection signal respectively to said first multiplexer and said second calibration unit of said second communication device; and said second communication device further includes first and second antennas, said first antenna being coupled to said first calibration unit and transmitting the first output signal from said first calibration unit therethrough, said second antenna being coupled to said second multiplexer, receiving the second RF signal therethrough and transmitting the second RF signal to said second multiplexer.

5. The fiber-optic communication apparatus of claim 4, wherein, when said fiber-optic communication apparatus operates in the power calibration mode, said RF processor of said first communication device is operable to estimate a distance between said first and second communication devices based on the detected power level indicated by the detection signal and the second predetermined power level.

6. The fiber-optic communication apparatus of claim 4, wherein, when said fiber-optic communication apparatus operates in the normal mode, said second calibration unit of said second communication device is operable to generate an indication signal indicating the multiplication factor based on the second power attenuation ratio; and said RF processor of said first communication device receives the indication signal from said second calibration unit of said second communication device, and is operable to estimate a distance between said first and second communication devices based on the multiplication factor indicated by the indication signal.

7. A communication device configured to be used within a fiber-optic communication apparatus capable of operating in a normal mode and a power calibration mode, said communication device comprising:

a signal generator operable to generate a calibration signal with a predetermined power level;

an antenna operable to receive a radio frequency (RF) signal therethrough;

a multiplexer coupled between said signal generator and said antenna for receiving the calibration signal and the RF signal therefrom, respectively, said multiplexer being operable to output one of the calibration signal and the RF signal as a selection signal in response to a control signal;

a controller coupled to said multiplexer, and operable to generate the control signal in accordance with a desired one of the normal and power calibration modes of said communication device such that said multiplexer outputs the calibration signal as the selection signal when the fiber-optic communication apparatus operates in the power calibration mode, and outputs the RF signal as the selection signal when the fiber-optic communication apparatus operates in the normal mode;

a calibration unit coupled to said multiplexer for receiving the selection signal therefrom, and further receiving from another communication device a detection signal indicating a detected power level, said calibration unit being operable to generate an output signal, which has a power level identical to that of the calibration signal serving as the selection signal, and obtain a power attenuation ratio based on the detected power level indicated by the detection signal and the predetermined power level when the fiber-optic communication apparatus operates in the power calibration mode, and adjust a power level of the RF signal serving as the selection signal based on the power attenuation ratio such that the RF signal with the adjusted power level serves as the output signal when the fiber-optic communication apparatus operates in the normal mode; and an electro-optic converter coupled to said calibration unit for converting the output signal therefrom into an optical signal.

* * * * *